(12) United States Patent
Toren et al.

(10) Patent No.: US 9,235,373 B2
(45) Date of Patent: Jan. 12, 2016

(54) REAL-TIME MANAGEMENT OF CONTENT DEPICTED ON A PLURALITY OF DISPLAYS

(75) Inventors: Jamie Toren, Atlanta, GA (US); Mark Edward Causey, Tucker, GA (US); Brian Kevin Daly, Seattle, WA (US); Qingmin Hu, Sammamish, WA (US); Karen Mullis, Loganville, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 211 days.

(21) Appl. No.: 13/539,329

(22) Filed: Jun. 30, 2012

(65) Prior Publication Data

US 2014/0002327 A1 Jan. 2, 2014

(51) Int. Cl.
*G09G 5/12* (2006.01)
*G06F 3/14* (2006.01)

(52) U.S. Cl.
CPC ........ *G06F 3/1423* (2013.01); *G09G 2300/026* (2013.01); *G09G 2320/0693* (2013.01); *G09G 2340/14* (2013.01); *G09G 2356/00* (2013.01)

(58) Field of Classification Search
CPC ................ G06F 3/1423; G06F 3/1446; G06F 2200/0614; G09G 2300/026; G09G 2340/0492; G09G 2340/045; G09G 2360/04
USPC .................................................. 345/1.1–1.3
See application file for complete search history.

(56) References Cited

U.S. PATENT DOCUMENTS

| | | | | |
|---|---|---|---|---|
| 6,046,709 A * | 4/2000 | Shelton et al. | ................. | 345/1.1 |
| 6,340,957 B1 * | 1/2002 | Adler et al. | .................... | 345/1.3 |
| 6,667,878 B2 | 12/2003 | Ponx | | |
| 8,963,803 B2 * | 2/2015 | Kerr et al. | ...................... | 345/2.3 |
| 2003/0071832 A1 * | 4/2003 | Branson | ........................ | 345/698 |
| 2005/0057434 A1 * | 3/2005 | Youn | ................ | 345/1.3 |
| 2005/0168399 A1 * | 8/2005 | Palmquist | ...................... | 345/1.1 |
| 2006/0097954 A1 * | 5/2006 | Huang | ........................... | 345/1.1 |
| 2007/0273609 A1 * | 11/2007 | Yamaguchi et al. | ........... | 345/1.1 |
| 2010/0053164 A1 * | 3/2010 | Imai et al. | ...................... | 345/427 |
| 2011/0140991 A1 | 6/2011 | Brenneman | | |
| 2012/0062475 A1 * | 3/2012 | Locker et al. | .................. | 345/173 |
| 2012/0206319 A1 * | 8/2012 | Lucero et al. | .................. | 345/1.3 |
| 2012/0242596 A1 * | 9/2012 | Sip | ................................. | 345/173 |
| 2012/0280898 A1 * | 11/2012 | Lucero et al. | .................. | 345/156 |
| 2013/0222266 A1 * | 8/2013 | Gardenfors et al. | .......... | 345/173 |
| 2013/0265487 A1 * | 10/2013 | Yu et al. | ........................ | 348/383 |

* cited by examiner

*Primary Examiner* — Dorothy Harris
(74) *Attorney, Agent, or Firm* — Hartman & Citrin LLC

(57) ABSTRACT

The subject disclosure provides devices, methods, and computer readable programs for establishing a secure wireless connection among a plurality of displays thus forming a screen for purposes of depicting a larger version of a content. The formation of the screen may be initiated by a master display detecting a presence of a plurality of slave displays in the master display's vicinity and requesting permission to connect to the detected slave displays. Furthermore, provided are methods and computer-executable programs that may facilitate easier collaboration and exchange of the content among users, a real-time adjustment of the content displayed on the screen, as well as an easier depiction of 3-dimensional content on a screen created by arranging the plurality of displays in a 3-dimensional configuration.

15 Claims, 16 Drawing Sheets

REAL-TIME MANAGEMENT OF CONTENT DEPICTED ON A PLURALITY OF DISPLAYS

BACKGROUND OF THE SUBJECT DISCLOSURE

1. Field of Disclosure

The subject disclosure relates to managing content depicted on a plurality of displays. More specifically, the subject disclosure relates to real-time management of content depicted on a screen formed by wirelessly connecting a plurality of displays.

2. Background of Disclosure

During meetings and conferences, communication and collaboration among two or more parties often involves sharing of contents related to a subject matter being discussed. This sharing of contents may be possible by putting together participants' communication devices having electronic displays, such as cellular telephones, tablets, etc. to create one large screen depicting the content to be shared. However, not every participant present within a group of participants may be willing or able to share their display in creating the screen. While collaborating on a specific content, a number of events may take place. For example, a new participant may join in, an already present participant may leave, a participant may change the orientation and position of his or her display, or there may be a need for a more realistic depiction of a 3-dimensional content. In the event that a new participant having an electronic display joins the collaboration, it is extremely inefficient to disconnect the screen and setup the screen from scratch incorporating the newly added electronic display. Similarly it is extremely inefficient to disconnect the screen, remove a display from among the displays forming the screen, and thereafter connect the remaining displays again to form the screen. Changing the orientation/position of any of the displays forming the screen has adverse effects on the size and the overall presentation of the content being depicted on the screen. Furthermore, when participants collaborate on a particular content shown on the screen, it is cumbersome for them to have to share their contributions, either before or after the actual collaboration, through other means including an e-mail or exchange of a portable hardware such a flash drive.

SUMMARY OF THE SUBJECT DISCLOSURE

The subject disclosure presents devices, methods, and computer-executable codes for a real-time management of content depicted on a plurality of displays. In one example embodiment, the subject disclosure is a method for real-time management of a content depicted on a screen formed from connecting a first display to a second display detected in a vicinity of the first display. The method includes determining a plurality of segments of the content to be assigned to each of the first and second displays in real-time based upon a change in position of one of first and second displays, the change in position being detected by a plurality of sensors coupled to the first display.

In yet another example embodiment, the subject disclosure is a display for depicting a content on a screen formed by a combination of at least the display and a slave display. The display includes a processor, a plurality of sensors, and a logic for determining a plurality of segments of the content to be assigned to each of the displays in real time based upon a change in position of at least one of the displays.

In yet another example embodiment, the subject disclosure is a computer-executable code stored on a computer-readable medium which when executed by a processor enables a master display to manage a depiction of a content on a screen, formed from connecting the master display with a slave display detected in a vicinity of the master display, in real-time. The computer-executable code includes instructions for determining a plurality of segments of the content to be assigned to each of the master and slave displays in real-time based upon a change in position of one of the displays with the change in position being detected by a plurality of sensors coupled to the master display.

DETAILED DESCRIPTION OF THE SUBJECT DISCLOSURE

Figure 1A:
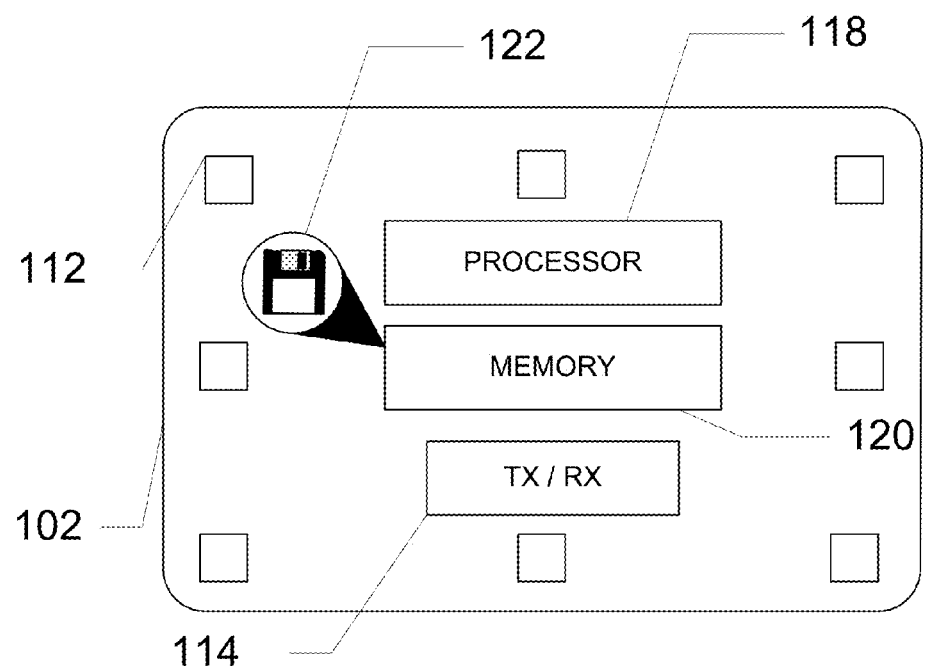
FIGS. 1A-C show a content depicted on a single display and a plurality of displays, according to an example embodiment of the subject disclosure.

The subject disclosure provides devices, methods, and computer readable programs for forming a screen by wirelessly connecting two or more displays, and managing the content depicted on the screen in real-time. The content depicted on the screen may be adjusted based on a change in orientation of a display, adding one or more displays to the screen, removing one or more display from the screen, viewers' angle of observation with respect to the screen, a display being raised or lowered from a plane formed by the screen, and when the displays forming the screen are arranged in a 3-dimensional configuration.

In example embodiments of the subject disclosure, a master display depicting a particular content to be shared may detect one or more slave displays in the vicinity of the master display through sensors coupled to the master display. When a slave display is detected, the master display may request a permission from the detected slave display to connect to the slave display for purposes of forming a screen comprising both displays. Upon permission being granted from the detected slave display, the master display may share the content with the slave display forming the screen and, thus, each display may be assigned a segment of the content such that the screen as a whole may depict the entire content.

Once a specific content is shown on the screen, a copy of the content may be saved on a memory of each display included in the screen, at preset time intervals. A logic located on the display may direct the processor to execute a set of instructions for saving the content. A user may set such a time interval, or it may be a predetermined feature included within each display. The saving eliminates any potential need for sharing the content, via other means of exchanging data such as e-mail, before starting a collaboration as well as at the end of the collaboration at which point the content may have been altered or edited during the collaboration.

Once a specific content is depicted on a screen, it may be adjusted in real-time as the component displays of the screen are adjusted. For instance, if an orientation of one of the displays forming the screen changes, then segments of the content assigned to each display may be recalculated and adjusted such that the depiction of the entire content on the screen remains the same. If a new display is added to the screen, then segments of the content assigned to each display may be recalculated and adjusted such that the overall depiction of the content on the screen remains the same. If a display is removed from the screen, then segments of the content assigned to each display may be recalculated and adjusted such that the overall depiction of the content on the screen remains the same. A removed display may also be enabled to have the entire content displayed on the removed display individually.

Moreover, if a viewer looking at a screen changes his or her viewing position relative to the screen, the orientation of the content may be adjusted so that the content is properly depicted from the viewer's perspective. Furthermore, if a 3-dimensional content is intended to be displayed on a screen, the displays may be configured in a 3-dimensional configuration so as to enable viewers to obtain a more realistic depiction of a 3-dimensional content and be able to better examine such a content by being able to walk around the screen and look at the content from different angles.

The detecting, authorizing, and connecting of displays as well as adjusting any content that may be shown on a screen created from putting together detected displays may be performed by any combination of hardware, software, logic, transceivers, etc. that may be embedded within each display. Such software may be installable on any existing or future electronic display. The software may carry algorithms for implementing how displays may be connected together, how they may communicate, how a screen may be formed or terminated as well as how a content depicted on a screen may be adjusted should any of the changes necessitating an adjustment occur.

There are many different ways to embody the subject disclosure. For simplicity, the following example embodiments present, for the most part, a minimal amount of structure necessary to achieve the functions of the subject disclosure. In many of the following example embodiments, one device, network, terminal, memory, logic, etc. is shown where a plurality may be used in tandem to achieve the same function. Those having skill in the art will recognize these pluralities, which are within the scope of the subject disclosure.

Figure 1B:
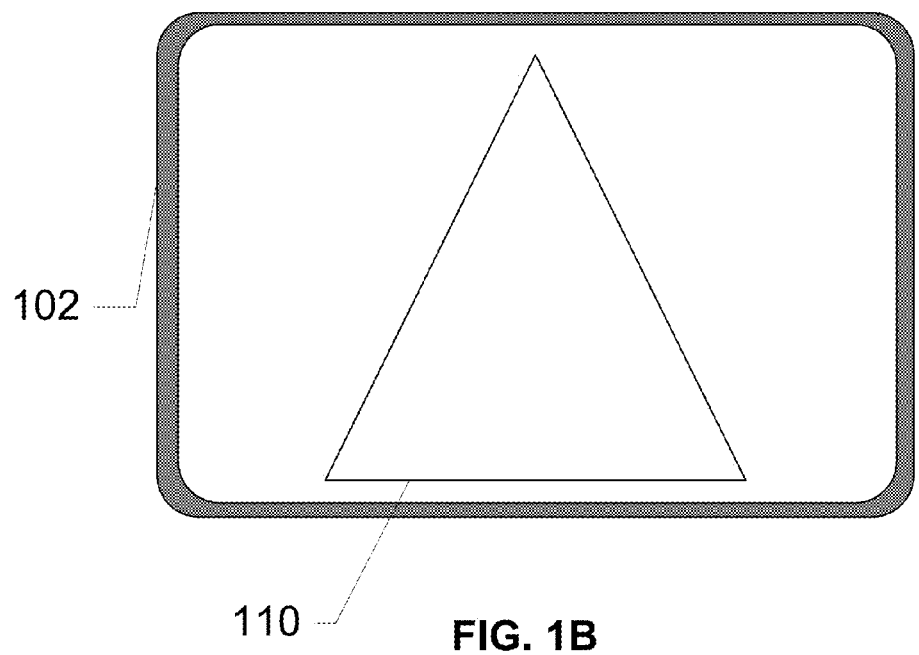
Figure 1C:
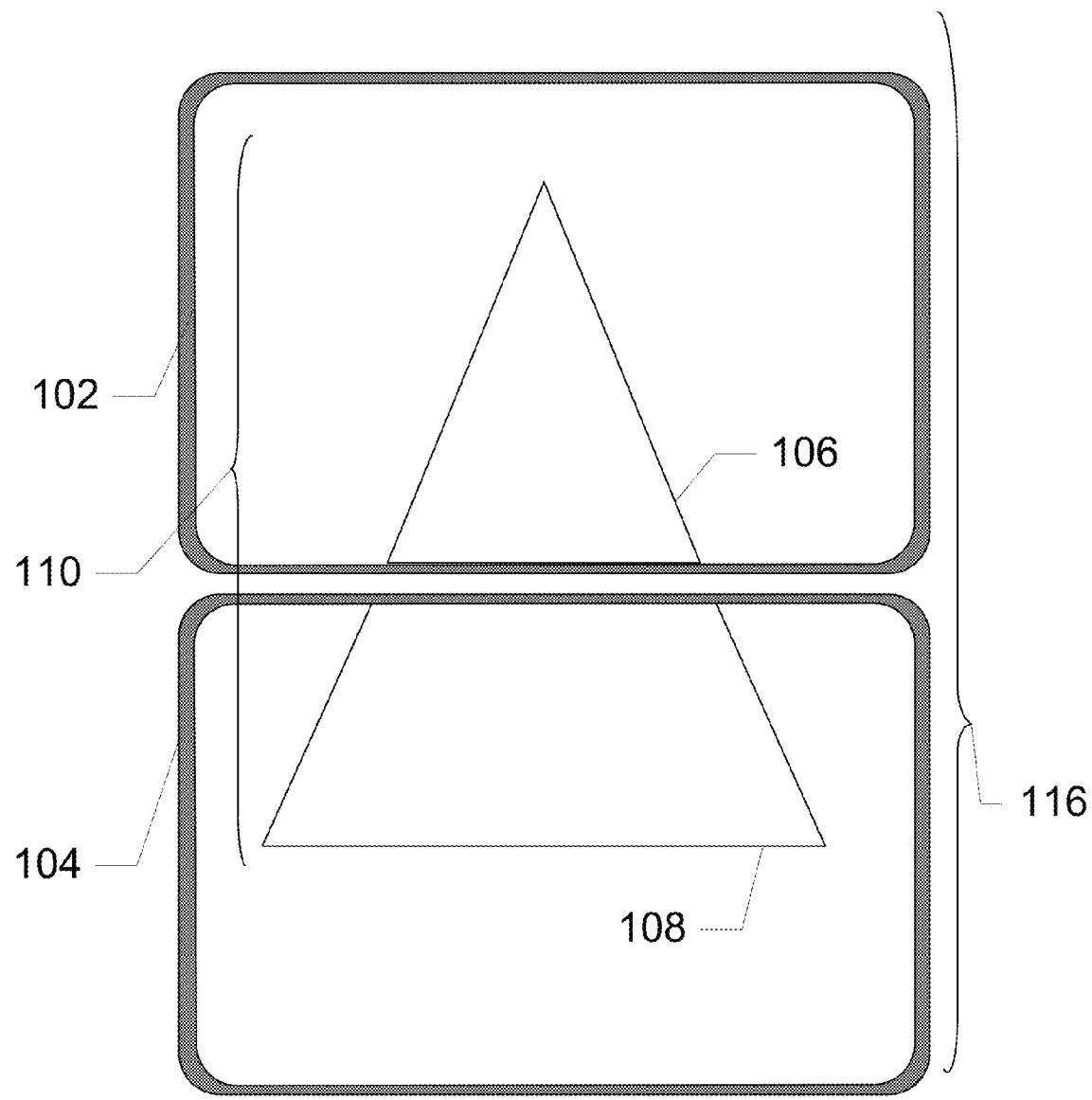

FIGS. 1A-C show content depicted on a single display and a plurality of displays, according to an example embodiment of the subject disclosure. FIG. 1A shows several hardware components of a display 102 for enabling the methods of the subject disclosure. There are eight sensors 112 shown in FIG. 1A, collectively referred to as a sensor assembly. The sensor assembly is shown to be included on the edges of the display 102 and may include a plurality of different sensors 112 used for purposes of detecting other displays, as well as any viewers in a vicinity of the master display. The sensors 112 may include motion sensors, accelerometers, proximity sensors, near-field communication devices, electronic compasses, and viewer sensors. Further, the sensors 112 may be placed anywhere within display 102, not just the edges as shown. Also shown in FIG. 1A is a wireless transceiver 114. Wireless transceiver 114 may include a built-in antenna for transmitting and receiving signals or may be connected to an external antenna (not shown) attached to a display on which the wireless communication component may reside. Through wireless transceiver 114, master display 102 may communicate authorization requests as well as contents to be shared with other detected slave displays. Wireless transceiver 114 may include any combination including a radio-frequency identification tag (RFID), a Wi-Fi adapter, Bluetooth chip, an RF transceiver, an optical coupler, a Zigbee transceiver, and an infrared data association unit. A processor 118 may be incorporated into display 102 and being in communication with wireless component 114 and sensors 112. Processor 118 enables processing of data collected by sensors 112 and may also connect with the wireless transceiver 114 for facilitating transmission and receiving of data to other displays. Processor 118 may be any type of processor including computer processors (processing units), microprocessors, digital signal processors, controllers, or microcontrollers. A memory 120 may be incorporated into display 102 and being in communication with processor 118. The memory 120 may be used to carry logic 122 used in implementing the method of the subject disclosure. Memory 120 may be any type of memory including RAM (random access memory), flash memory, ROM (read-only memory), EPROM (erasable programmable read-only memory), EEPROM (electrically erasable programmable read-only memory), hard drives, disks, diskettes, compact discs (CD), digital versatile discs (DVD), and tapes. Logic 122 may include digital and/or analog hardware circuits, for example, hardware circuits comprising logical AND, OR, XOR, NAND, NOR, and other logical operations. Logic may be formed from combinations of software and hardware.

FIG. 1B shows a master display 102 depicting a content 110. Content 110 may be any visual depiction including a video, a picture, a document, a spreadsheet, a slide presentation, a website, and a simulation using a particular computer program. Content 110 may be depicted on a screen formed by connecting master display 102 with one or more slave displays that may be detected in the vicinity of the master display 102. Master display 102 may be a standalone display including Light Emitting Display (LED), Liquid Crystal Display (LCD), Electroluminescent Display (ELD), Organic Light Emitting Diode (OLED), Carbon nanotubes, nanocrystal displays, or may be coupled to an electronic device with a display, such as a laptop computer that may have an LCD monitor, a tablet computer such as an iPad® and Galaxy Tab® that may have a touch-screen enabled display, a cellular telephone such as a BLACKBERRY®, an IPHONE®, or an ANDROID® smartphone.

FIG. 1C shows a screen 116 that may be formed by connecting a master display 102 with a slave display 104 detected in the master display's vicinity. Slave display 104 may be the same type of display as master display 102, or may be different type of display, such as the types listed above. Slave display 104 may further include the sensors 112 shown above with respect to FIG. 1A, as well as a wireless transceiver, a processor, and a memory. Consequently, slave display 104 may also detect and communicate with additional slave displays that may become part of the screen. By incorporating similar set of hardware as master display 102, slave display 104 may become a new master display and share a specific content it has stored within its memory with other slave displays forming screen 116.

Upon screen 116 being formed from connecting displays 102 and 104 together, a larger version of content 110 may be depicted on screen 116, allowing for viewers to more easily collaborate on the displayed content 110. As depicted in FIG. 1C, each individual display 102, 104 forming the screen 116 may be assigned a segment of the content 110. For example, master display 102 may be assigned segment 106 of content 110, and slave display 104 may be assigned segment 108 of content 110. The assignments may be determined via logic 122 located on master display 102. Logic 122 may receive information obtained from the sensors 112 as to the position of the detected slave displays 104. By knowing the number of displays 102, 104 forming the screen 116 as well as their positions with respect to one another, the logic 122 may determine into how many segments 106, 108 the content 110 may be divided and to which display 102, 104 each segment 106, 108 may be assigned. Logic 122 may be embedded in the master display 102 as well as every slave display 104, however the logic 122 responsible for carrying out the assignment of content segments 106, 108 may be the logic 122 located on a designated master display 102.

Once the content 110 is displayed on the screen 116, a copy of the content 110 may be saved on display 102 and display 104. The content 110 may be saved once, or at predetermined periods, with the period for saving being set by a user of a display 102, 104 or being a feature programmed within logic 122. This periodic saving eliminates a need for such exchange of copies of any content shown on a screen 116, by automatically saving the content on every display 102, 104 that is part of the screen 116. The saving may occur once the screen 116 is formed. Thereafter a periodic saving, for example every 10 seconds, may occur as users collaborate on a specific content 110. A final copy of the content 110 may be saved on memory 120 before terminating the screen 116. The screen 116 may be terminated upon the master display 102 being removed from the screen 116 wherein a user of the master display 102 may initiate the removal of the master display 102. Alternatively the screen 116 may be terminated when no more than one display 102, 104 is left in the screen 116.

Figure 2:
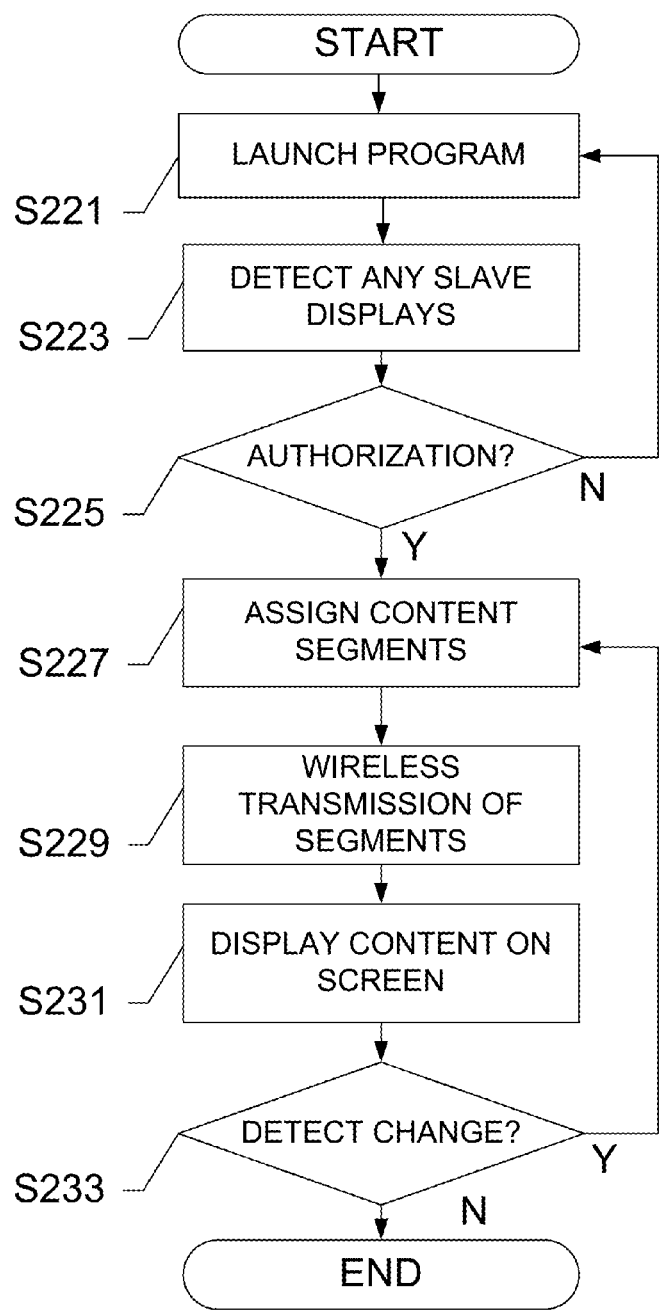
FIG. 2 describes a method for wirelessly detecting, authenticating and connecting a plurality of displays together to form a screen for depicting a content, according to an example embodiment of the subject disclosure.

FIG. 2 shows a method for wirelessly detecting, authenticating and connecting a plurality of displays together to form a screen for depicting a content, according to an example embodiment of the subject disclosure. According to this method, a user of a master display, having contents to share, may launch a program for detecting a potential slave display in the vicinity of master display for forming a screen (S221). The master display may detect a presence of a slave display in the vicinity of the master display (S223). This detection may occur via one or more sensors coupled to the master display. The range of this vicinity may depend upon the type of sensors being used. The range may be user-programmable. For instance, in a typical conference-room setting, although devices within the room are automatically detected, any device entering within a range of 6-12" of the master display may be treated as a slave device. Such a relationship may be formed using a combination of logic on both the master and slave devices, and may further involve the steps shown below.

For instance, upon detecting the slave display, the master display may transmit a request to the detected slave display asking for authorization to connect with the slave display (S225). The request may be in a form of a pop-up message. For example, a message may pop-up on the detected slave display's display stating: "Display X would like to share your screen. Please select OK to allow sharing". The message may further request the detected slave display to enter a password or PIN before establishing the connection. If the request is granted, the master display may receive notification of this approval, and may attempt to connect to the detected slave display. If denied the process may revert back to S221 or the program may be terminated by the user. The sending of the authorization and the connection made pursuant to a successful authentication may be done wirelessly. Thereafter, the master display, knowing the number of slave displays connected to the master display and each slave display's position with respect to the master display, determines what segment of the content is to be assigned to each detected slave display (S227). Assignment S227 may be performed through algorithms implemented using software located on a memory of the master display, and may include determining which segment of the depicted content is to be transmitted to which slave display in the screen.

Once this determination has been carried out, the master display may wirelessly transmit a segment of the content to each of the corresponding slave displays in the screen (S229). At this point the content that was originally displayed on the master display may be viewed on a screen formed by a combination of the master display and the connected slave displays, thus enabling a larger view of the content and easier collaboration on the content by the users of the displays (S231). Thereafter the program may continuously scan the vicinity of each display to detect any possible change in the screen (S233). If there is any change detected in the screen, the process may revert back to S227, triggering a recalculation of the respective assignments of each portion of the depicted content. If no change is detected, the screen may continue to display the content until the screen is terminated, such as by the master display terminating the screen by ending the program.

Figure 3A:
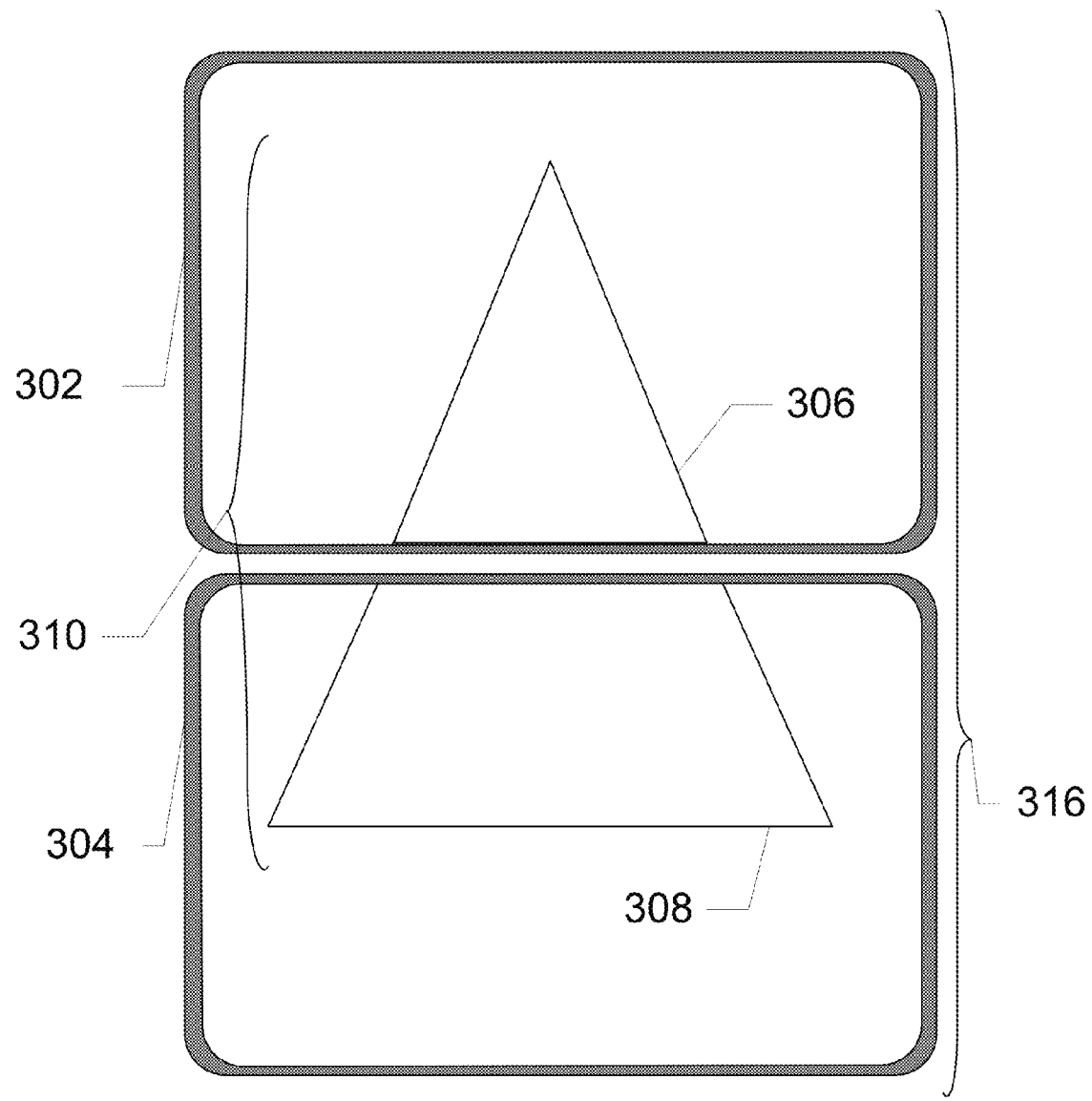
FIGS. 3A-B show a depiction of content being adjusted in real-time in response to a change in orientation of a display, according to an example embodiment of the subject disclosure.
Figure 3B:
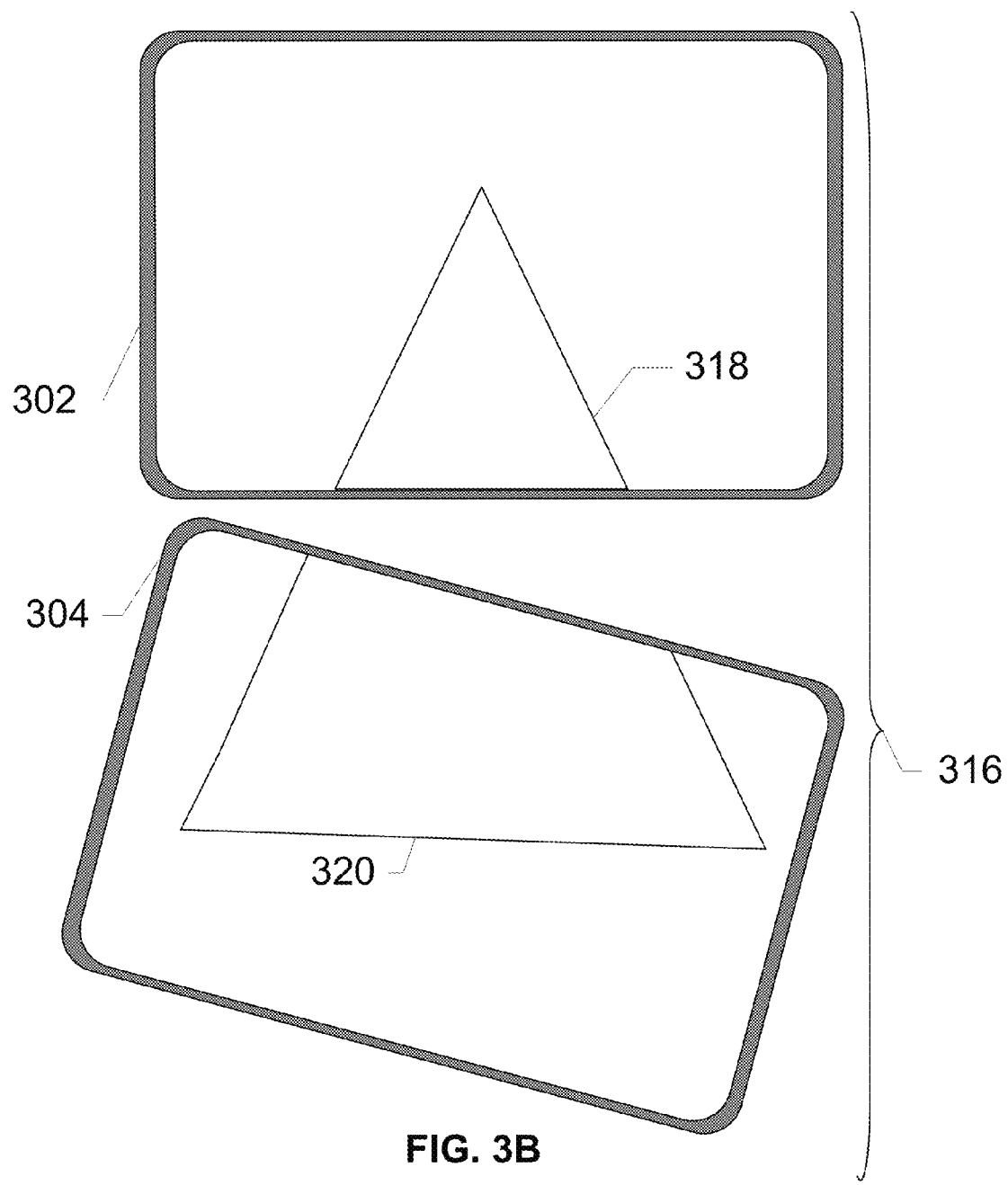

FIGS. 3A-B show a depiction of content being adjusted in real-time in response to a change in orientation of a display, according to an example embodiment of the subject disclosure. FIG. 3A shows two individual displays 302 and 304 forming a screen 316 that may be showing the content 310, with display 302 being the master display and display 304 being a slave display, or vice versa. Screen 316 may be formed in response to master display 302 detecting the presence of slave display 304 in the vicinity of master display 302, requesting access to slave display 304, and determining what portion or segment of content 310 to be assigned to slave display 304. As a result, displays 302 and 304 each may depict segments 306 and 308 of content 310 respectively. FIG. 3B shows how content segments 306 and 308 may be adjusted in real-time when slave display 304 changes its orientation. Such change in the orientation of display 304 may be clockwise or counter clockwise within the same plane of screen 316. Other embodiments disclosed herein show changes in orientation about multiple axes. In either case, the change in the orientation of slave display 304 may result in a real-time adjustment of segments 306 and 308 of content 310. Master display 302, through sensors including proximity and location sensors, may sense the change in the orientation of slave display 304. Logic onboard master display 302 may recalculate the new segments 318 and 320 and may assign the new segments 318 and 320 to displays 302 and 304 respectively. The new adjusted segments 318 and 320 are shown in FIG. 3B, which may be different from the previously assigned segments 306 and 308. This real-time adjustment may be such that the overall depiction of content 310 remains the same to an observer when compared to FIG. 3A. Further, the reassignment and calculation of segments 318 and 320 is not necessarily performed only by master display 302, but may be performed by logic on board slave display 304, or any combination of both displays 302, 304.

Figure 4A:
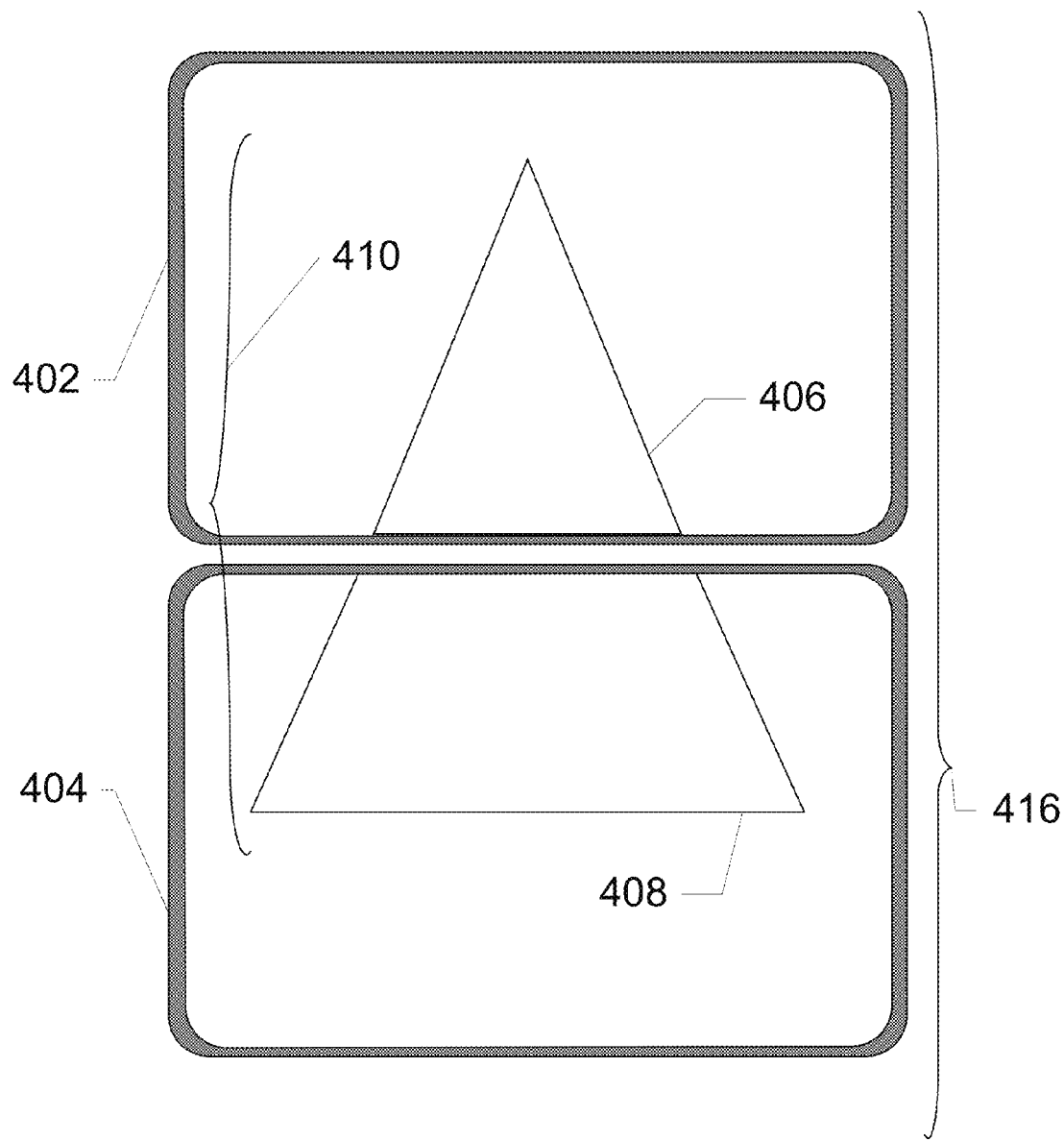
FIGS. 4A-B show a depiction of content being adjusted in real-time when a new display is added to an existing screen, according to an example embodiment of the subject disclosure.
Figure 4B:
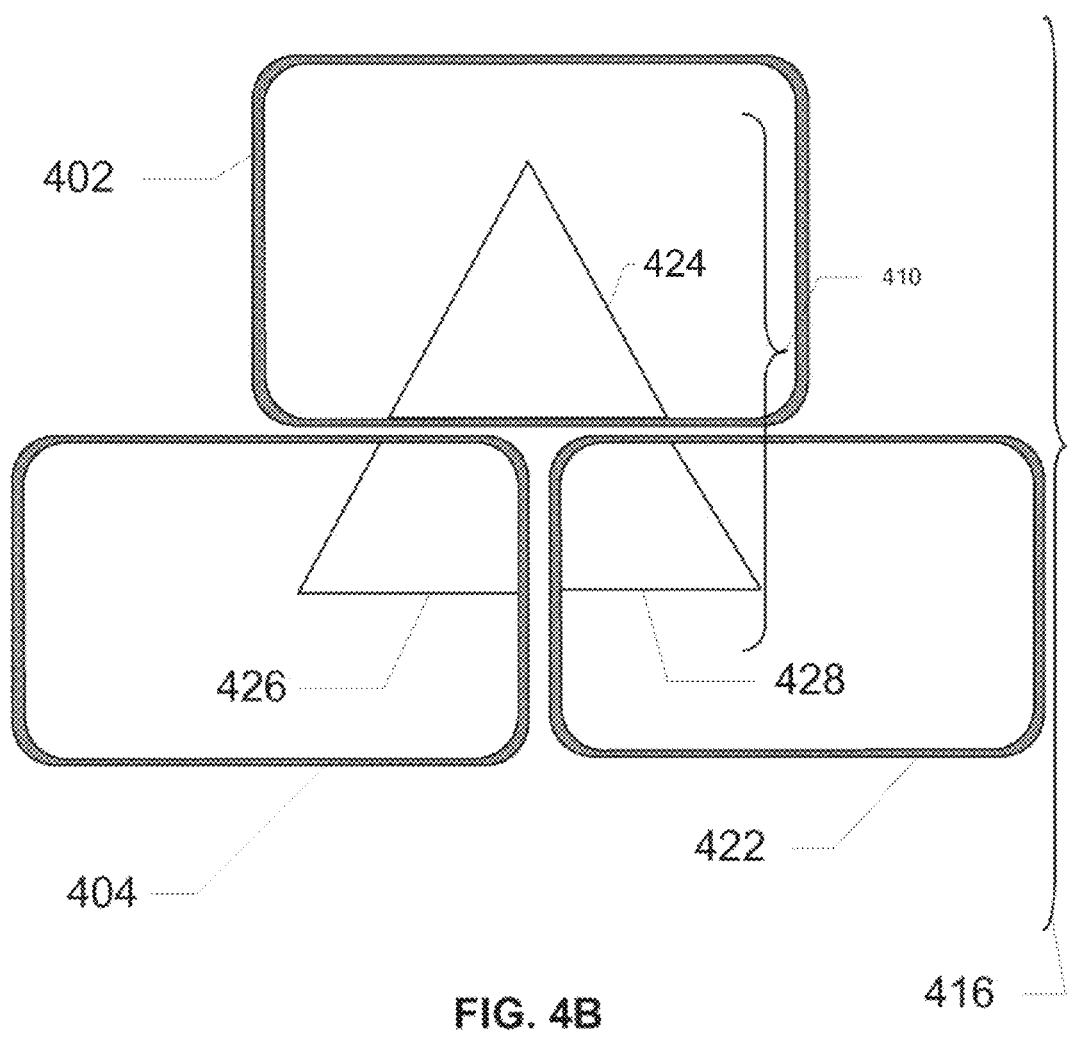

FIGS. 4A-B show a depiction of content being adjusted in real-time when a new display is added to an existing screen, according to an example embodiment of the subject disclosure. FIG. 4A shows two individual displays 402 and 404 forming a screen 416 that may be showing the content 410. Display 402 may be the master display, with display 404 being the slave display, or vice versa. Displays 402 and 404 each may depict segments 406 and 408 of content 410 respectively, with the segments 406, 408 being determined and assigned in real time as described herein and with respect to FIGS. 3A-B. FIG. 4B shows an example embodiment of the subject disclosure in which a new slave display 422 may be added to the already existing screen 416. Adding extra slave display 422 to screen 416 may result in a real-time adjustment of segments 406 and 408 of content 410. Once the master display 402 has detected an additional slave display 422, through similar sensors including proximity and location sensors, the master display 302 may recalculate new segments 424, 426, and 428 and may assign the new segments 424, 426, 428 to displays 402, 404, and 422 respectively. This assignment may be determined by logic onboard either a master display 402, or a slave display 404, 422, or any combination thereof. This real-time adjustment of the content 410 may be such that the overall depiction of content 410 may remain the same to an observer as when compared to FIG. 4A.

Figure 5A:
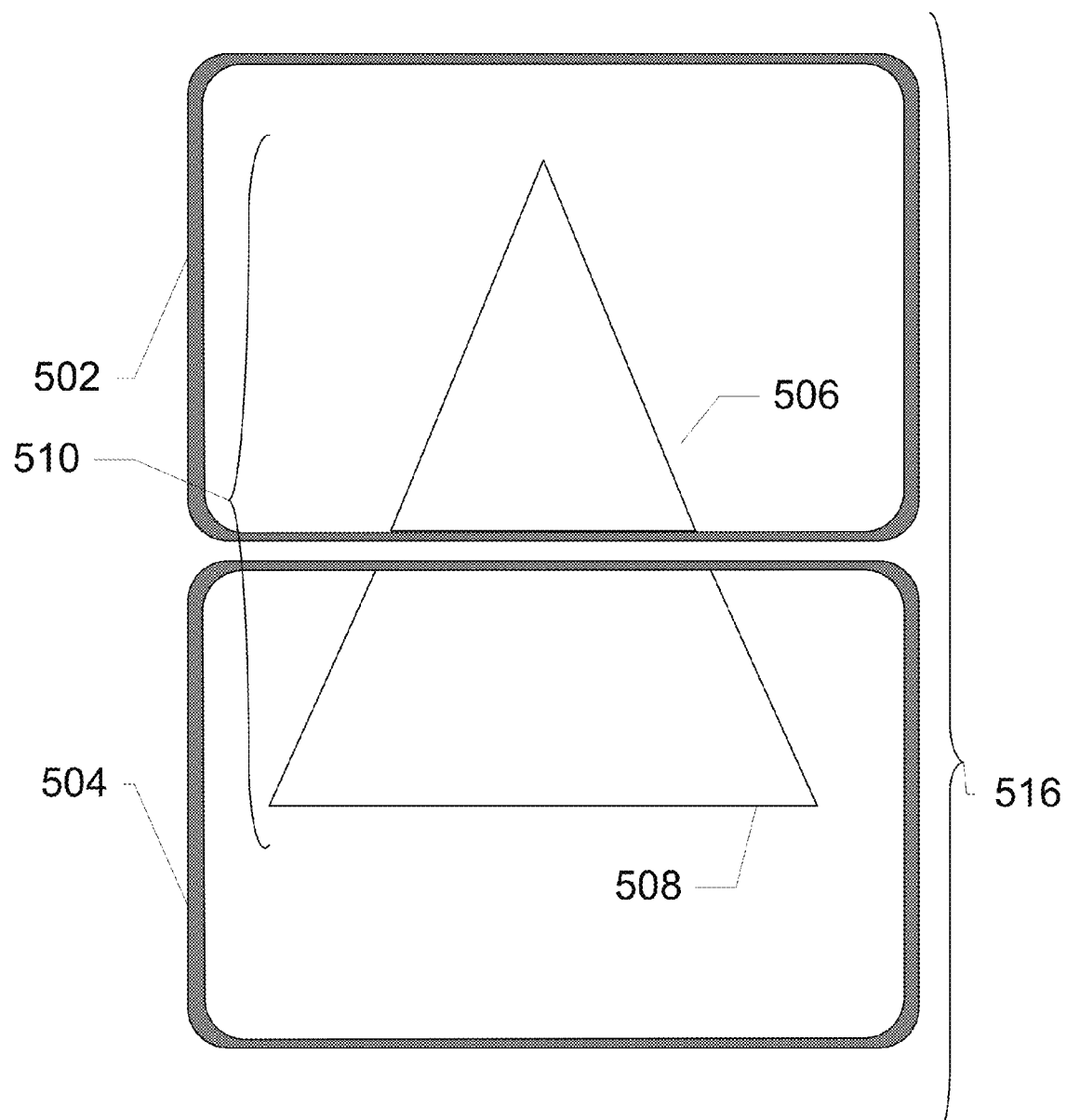
FIGS. 5A-B show a depiction of content being adjusted in real-time when a display is removed from an existing screen, according to an example embodiment of the subject disclosure.
Figure 5B:
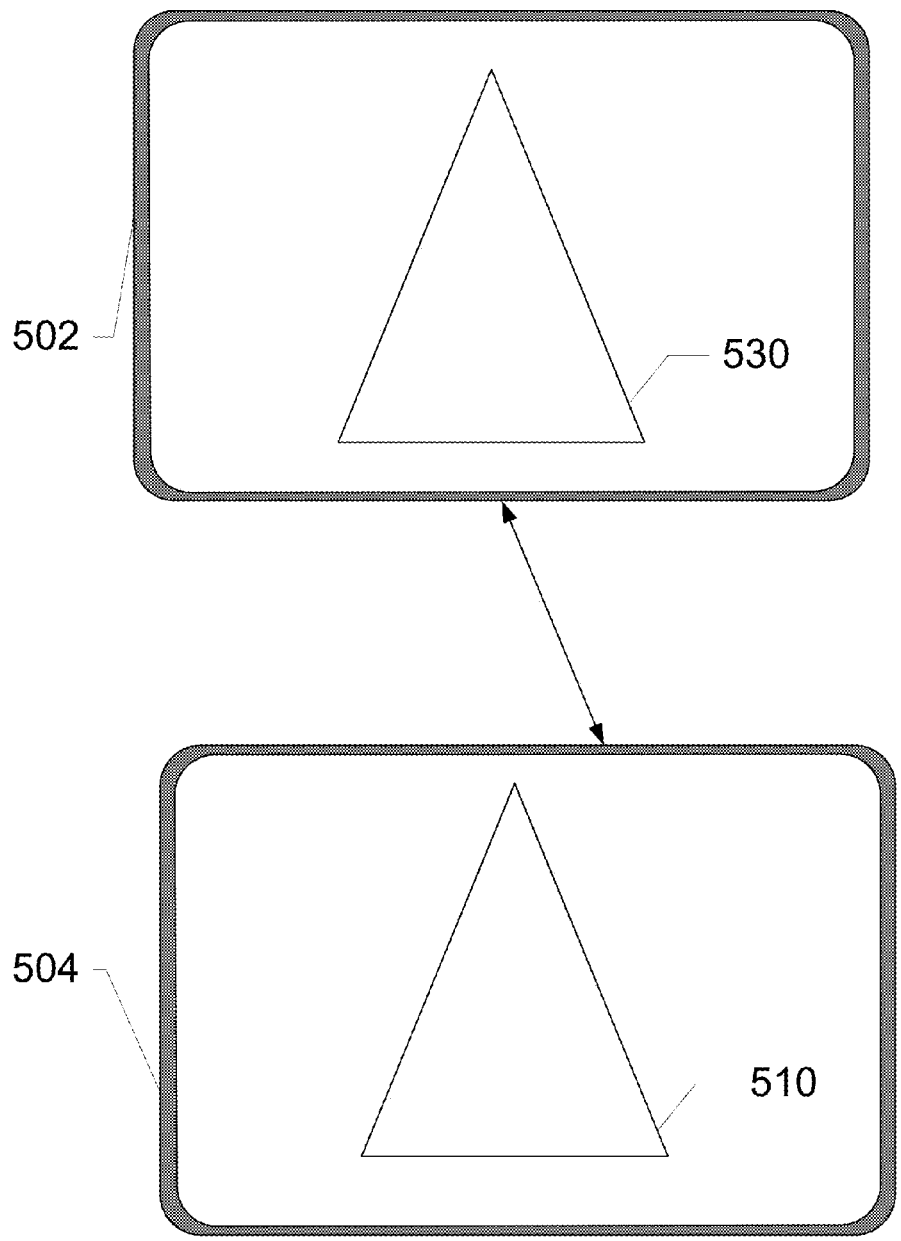

FIGS. 5A-B show a depiction of content being adjusted in real-time when a display is removed from an existing screen, according to an example embodiment of the subject disclosure. FIG. 5A shows two individual displays 502 and 504 that may form a screen 516 depicting content 510. Either one of displays 502, 504 may be a master or a slave, depending on which display is hosting the content, or which display was first used to set up screen 516. In either case, displays 502 and 504 each may depict segments 506 and 508 of content 510 respectively. FIG. 5B shows an example embodiment of the subject disclosure in which display 504 may be removed a certain distance from display 502, with distance being greater than the maximum vicinity required to form a screen. Consequently, removing display 504 from display 502 may result in a real-time adjustment of content segments 506 and 508 of the content 510. For instance, if a master device 502 detects the distance of slave display 504 greater than a prescribed maximum vicinity, through sensors including proximity and location sensors, master display 502 may determine that the screen no longer exists, and may simply assign new content segment 510 to be displayed in its entirety on display 502. The new content segment 530 may or may not be the same as content 510 shown individually on display 504.

The removal of a display such as display 504 from the screen 516 may be triggered according to a user-initiated event such as the user of display 504 terminating his or her display's wireless connection with the master display 502. The removal of display 504 from screen 516 may include placing display 504 at a new distance from display 502 such that any of the detection technologies, such as RFID, used in the sensors of these displays would not be capable of detecting a presence of another display. The real-time adjustment of the content may be such that the overall depiction of content 510 may remain the same compared to FIG. 5A.

The logic located on display 504 may also include a feature that enables a user of a display to terminate its connection with other displays at any time. Upon utilizing this feature, all the displays forming the screen 516 may receive a warning and a subsequent confirmation message indicating the removal of display 504 from the screen. According to the example embodiment shown in FIG. 5B, removed display 504 may also be able to display content 510 individually once removed from screen 516. This separate depiction of content 510 on the removed display 504 may facilitate a viewing at the user's personal preference should he or she desire to do so. For example, a user of display 504 may prefer to look at content 510 separately for any reason, for instance, limited eyesight that he or she may have. By first connecting his or her display to screen 516, the user may obtain a copy of content 510 on display 504. Thereafter, by removing display 504 from screen 516, the user may sit back and view content 510 separately.

Figure 6A:
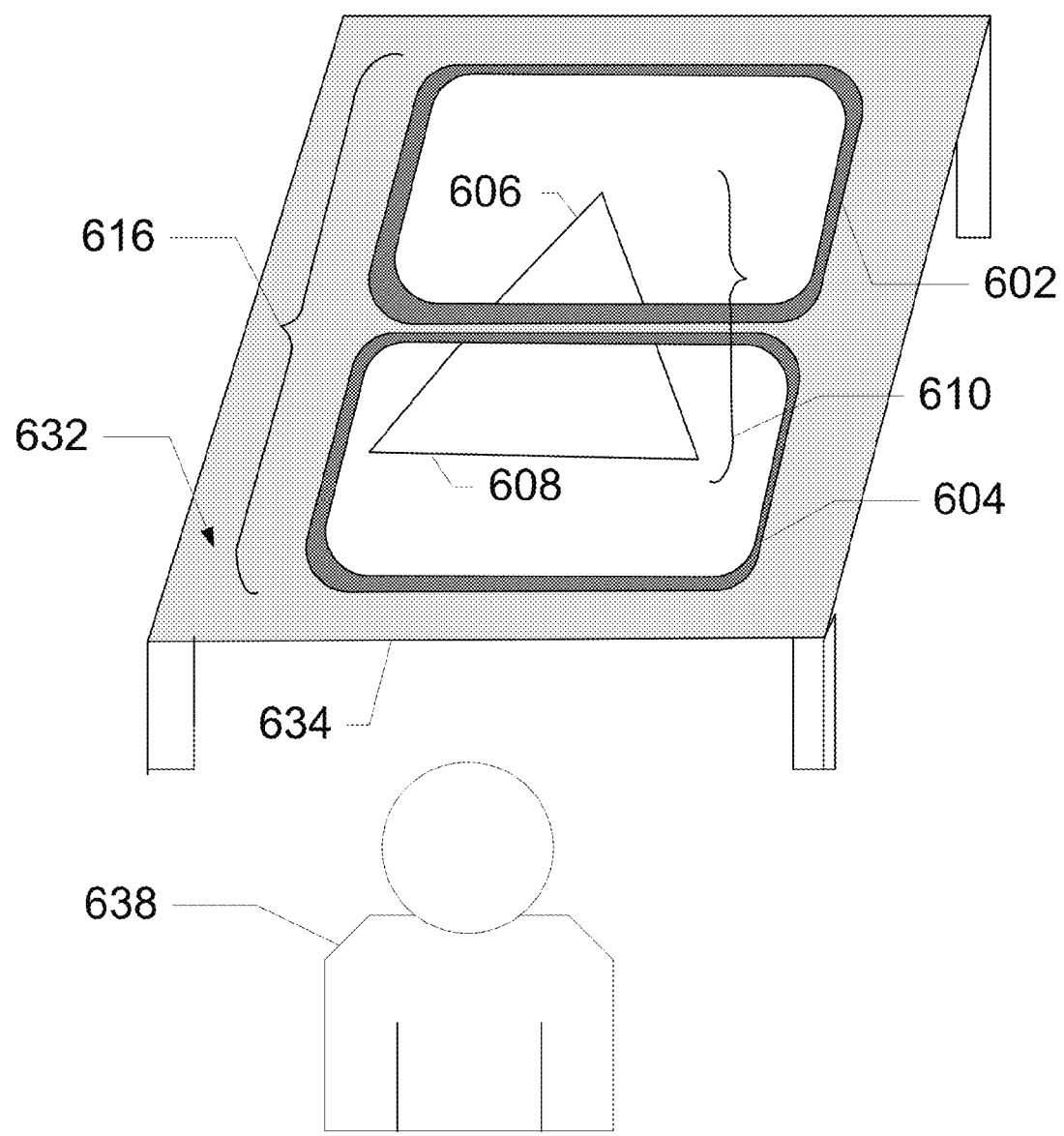
FIGS. 6A-B show a depiction of content being adjusted in real-time relative to a position of an observer, according to an example embodiment of the subject disclosure.
Figure 6B:
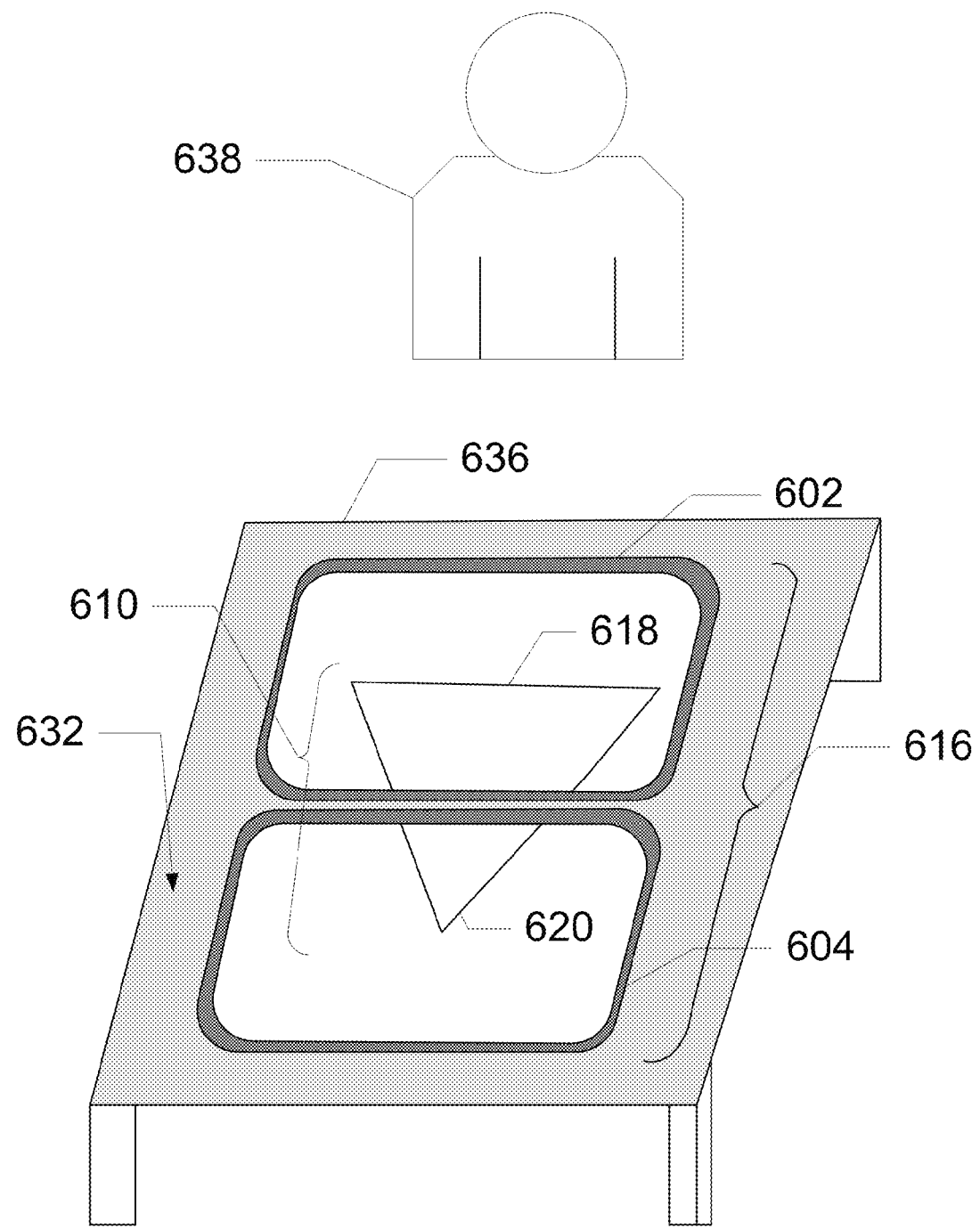

FIGS. 6A-B show a depiction of content being adjusted in real-time relative to the position of a viewer observing the content on a screen, according to an example embodiment of the subject disclosure. FIG. 6A shows two individual displays 602 and 604 forming a screen 616 that may be depicting content 610, with display 602 being the master display and display 604 being the slave display. Displays 602 and 604 may each depict content segments 606 and 608 of content 610 respectively, forming a screen 616. Furthermore, in FIG. 6A, screen 616 may be placed on a surface 632, with a viewer 638 that may be positioned at the near end 634 of surface 632 looking at the screen 616. FIG. 6A illustrates how viewer 638 may perceive content 610 depicted on screen 616, i.e. with the base of the triangle of content 610 facing the near end 634. FIG. 6B shows the same setup as in FIG. 6A except that viewer 638 may now be positioned at opposite end 636 of the surface 632 looking at the screen 616. In response, content 610 depicted on screen 616 may be adjusted in real-time to face the viewer 638, i.e. with the base of the triangle in content 610 now facing opposite end 636. Logic on either master or slave displays may assign new content segments 618 and 620 to displays 602 and 604 respectively, as depicted in FIG. 6B.

The sensing of a viewer's 638 position with respect to screen 616 may be accomplished using viewer sensors included within a sensor assembly, such as the sensor assembly discussed in relation to FIG. 1A. These sensors 112 may be incorporated into every display 602, 604 that may become part of the screen 616. These sensors 112 may be able to detect a viewer's 638 angle of observation and thus may adjust the depicted content 610 so as to always face the viewer 638 and the angle from which he or she is observing a screen 616. This adjustment may eliminate the need for viewers 638 to reposition themselves in order to get a more proper view of any content 610 that may be depicted on any such screen 616. In other embodiments, the viewer 638 may carry on their bodies a transceiver in communication with transceivers within the displays 602, 604 forming the screen 616, enabling logic on the master display 602 to determine a position of the viewer 638 and correspondingly re-assign the content segments 618, 620 in real-time. The transceiver may be a specialized device programmed to communicate with the displays 602, 604, or may simply be a mobile device such as a cellular telephone having appropriate logic programmed therein for performing such communication. Other sensor arrangements for determining a viewer's 638 location and orientation are possible, such as microphones, cameras, etc. Voice commands may be issued to re-orient content 610 displayed on the screen 616.

Figure 7A:
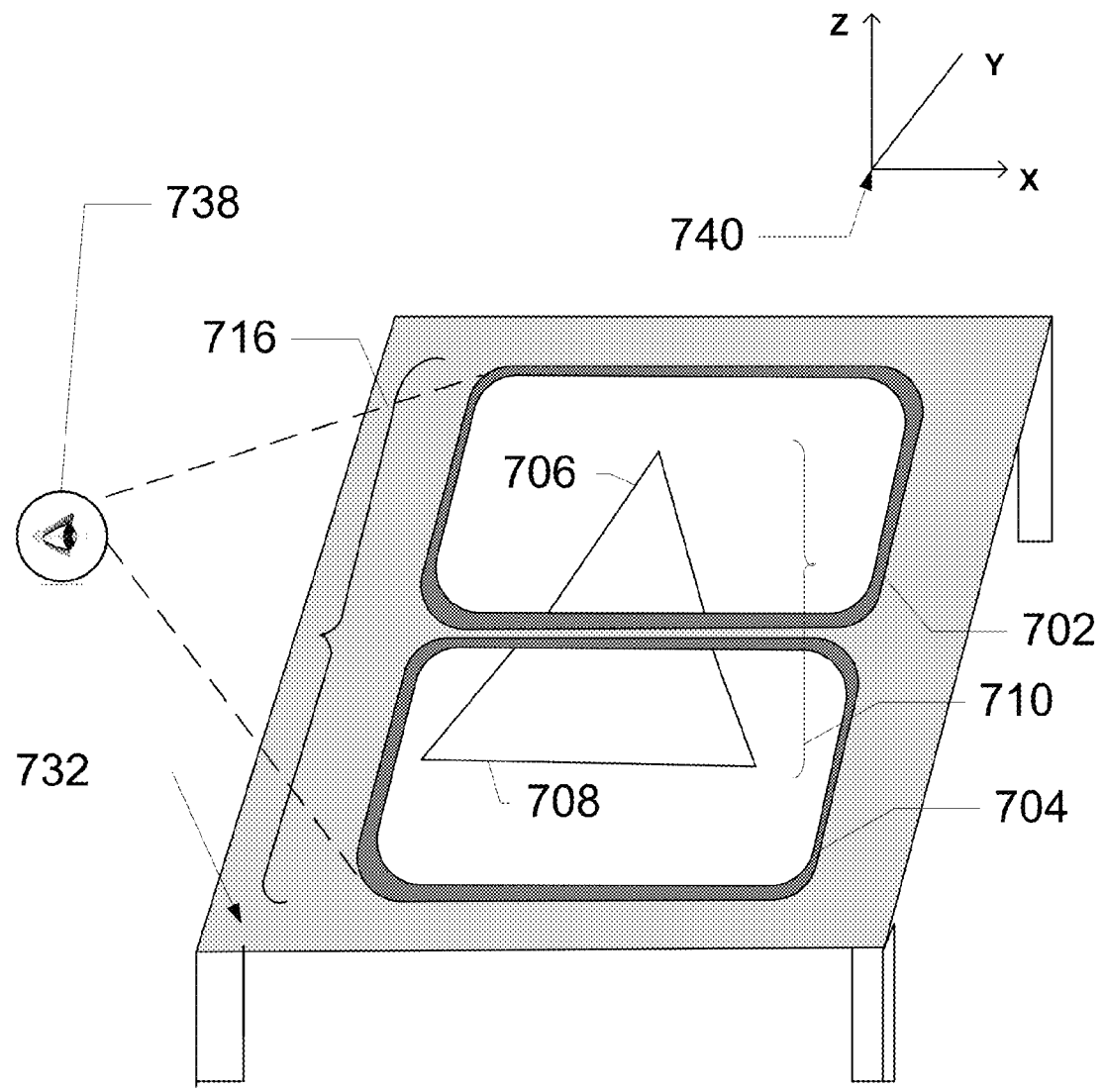
FIGS. 7A-B show a focus of a depicted content being adjusted in real-time in response to a display being raised from a plane formed by the screen, according to an example embodiment of the subject disclosure.
Figure 7B:
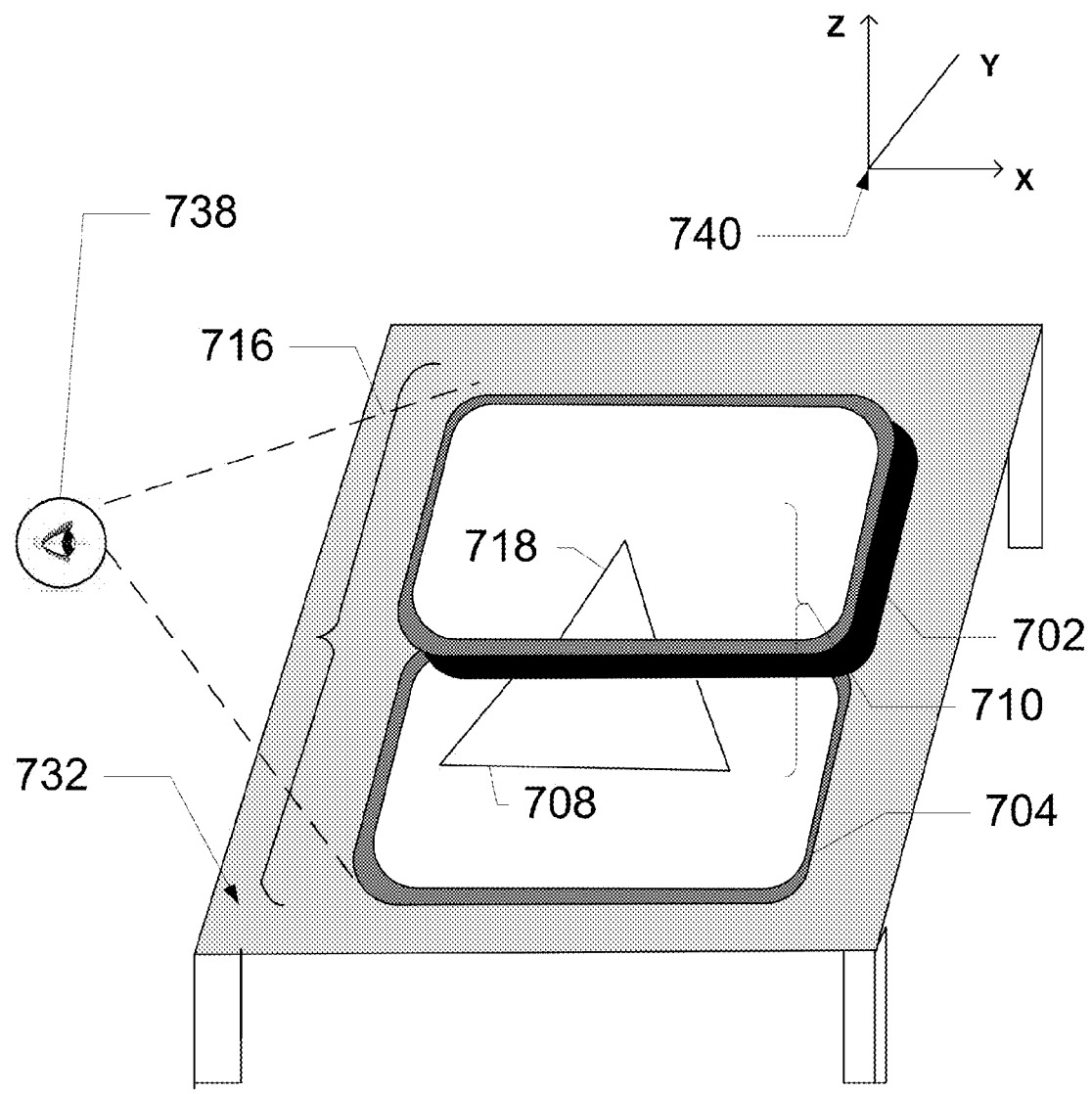

FIGS. 7A-B show a focus of a depicted content being adjusted in real-time in response to a display being raised from a plane formed by the screen, according to an example embodiment of the subject disclosure. FIG. 7A shows two individual displays 702 and 704 forming a screen 716 that may be showing the content 710, with display 702 being the master display and display 704 being the slave display, or vice versa. Displays 702 and 704 each may depict content segments 706 and 708 of content 710 respectively. Furthermore screen 716 may be placed on a surface 732 as shown in FIG. 7A, with a viewer 738 who may be positioned to look at the screen 716 from the top. Also depicted FIG. 7A is a 3-dimensional coordinate system 740, with dimensions X, Y, and Z. Surface 732 may be formed in a plane along the X and Y dimensions, called the XY plane. According to this example embodiment of the subject disclosure, any of the displays 702 or 704 forming the screen 716, may be raised from the XY plane along the Z-axis. When a display 702, 704 is raised a specific distance along the Z-axis, meaning closer to viewer 738, the focus of the content segment 706, 708 assigned to the raised display 702, 704 may change. The change may be in a form of the content 710 shrinking, indicating a zoom-out. The amount, by which the focus of the corresponding content segment 706, 708 may change, may be proportional to the distance that the display 702, 704 may have been raised. On the other hand, it may be possible to move a display 702, 704 a specific distance along the z-axis but away from viewer 738. As a result, the focus of the content segment 706, 708 assigned to the moved display 702, 704 may change. The change may be in a form of the content 710 blowing up, indicating a zoom-in. The amount by which the focus of the corresponding content segment 706, 708 may change may be proportional to the distance that the display 702, 704 may have been moved. The zoom-in/zoom-out feature may allow an overall depiction of the content 710 to stay relatively constant while displays 702, 704 may be located at different distances with respect to the plane that may have been formed by a screen 716. FIG. 7B is an example embodiment showing how the focus of a content segment 706, 708 may be adjusted in real-time, when one of the displays 702, 704 forming the screen 716 is raised from the surface 732. Display 702 may be raised along the Z-direction closer to viewer 738. As shown, focus of content segment 706 may shrink as a result of raising display 702, resulting in a new adjusted content segment 718, indicating a zoom-out on content segment 706. As discussed, the zoom-out may be relative to the distance that display 702 may have been raised. The zoom-out may be such that the overall depiction of content 710 on screen 716 may remain relatively the same compared to FIG. 7A.

The adjustment of the focus of any of the content segment 706, 708 of a particular content 710 being displayed on a screen 716, may similarly be achieved by any combination of hardware, software, logic, transceivers, etc. that may be embedded within each display 702, 704. The viewer sensors 112 of a sensor assembly may be used to examine and detect a change of distance between the viewer 738 and a particular display 702, 704, while location sensors 112 of the sensor assembly may be used to examine the distance that a particular display 702, 704 may be moved from its initial position along an axis that may be perpendicular to the plane formed by a screen 716. Through algorithms present on software that may be included in the logic located on the memory of any one of the displays 702, 704 forming the screen 716, an adjustment in the focus of a particular content 710 may be calculated and performed.

Figure 8A:
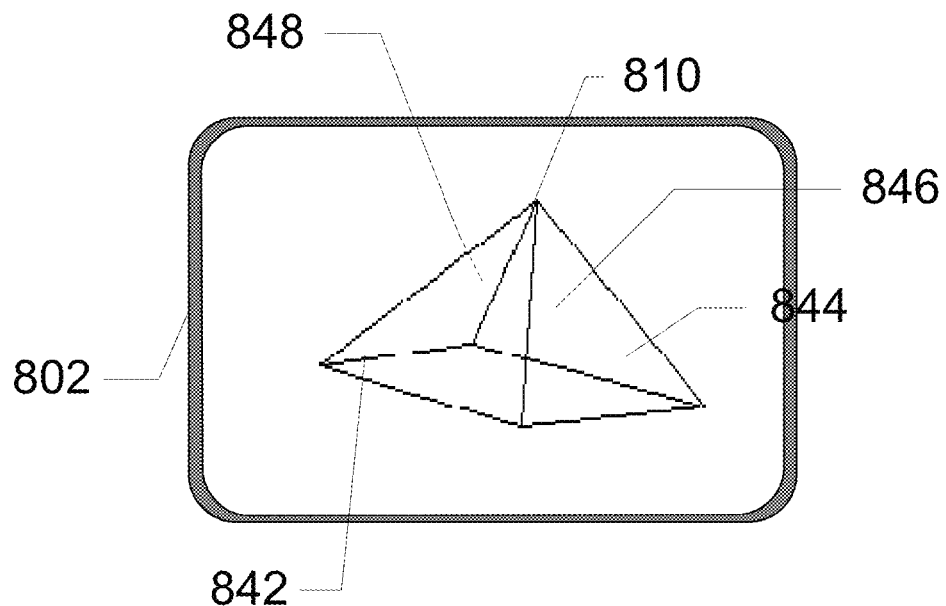
FIGS. 8A-C show a screen for depicting a 3-dimensional content, according to an example embodiment of the subject disclosure.
Figure 8B:
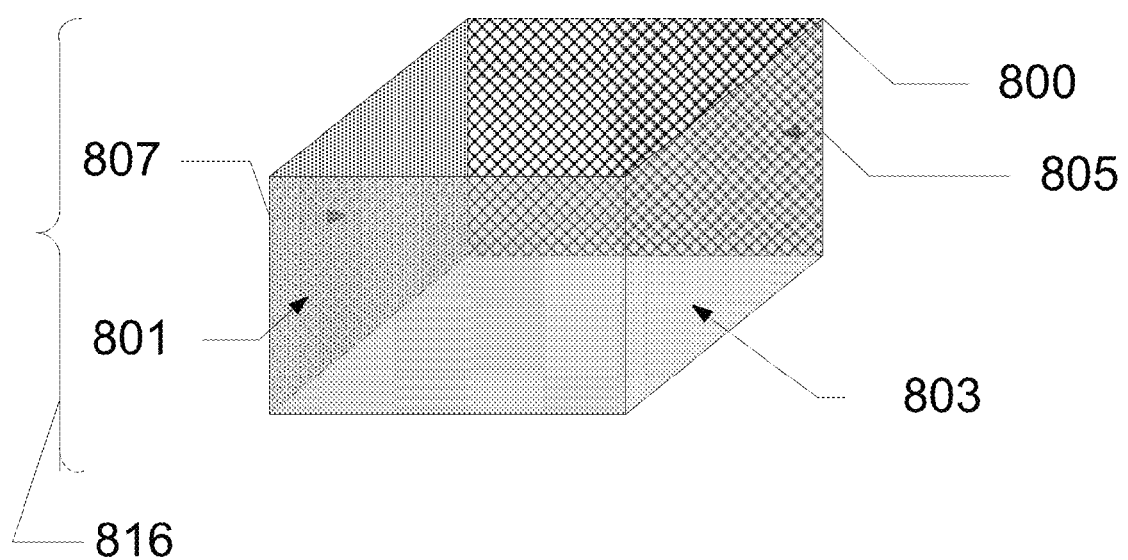
Figure 8C:
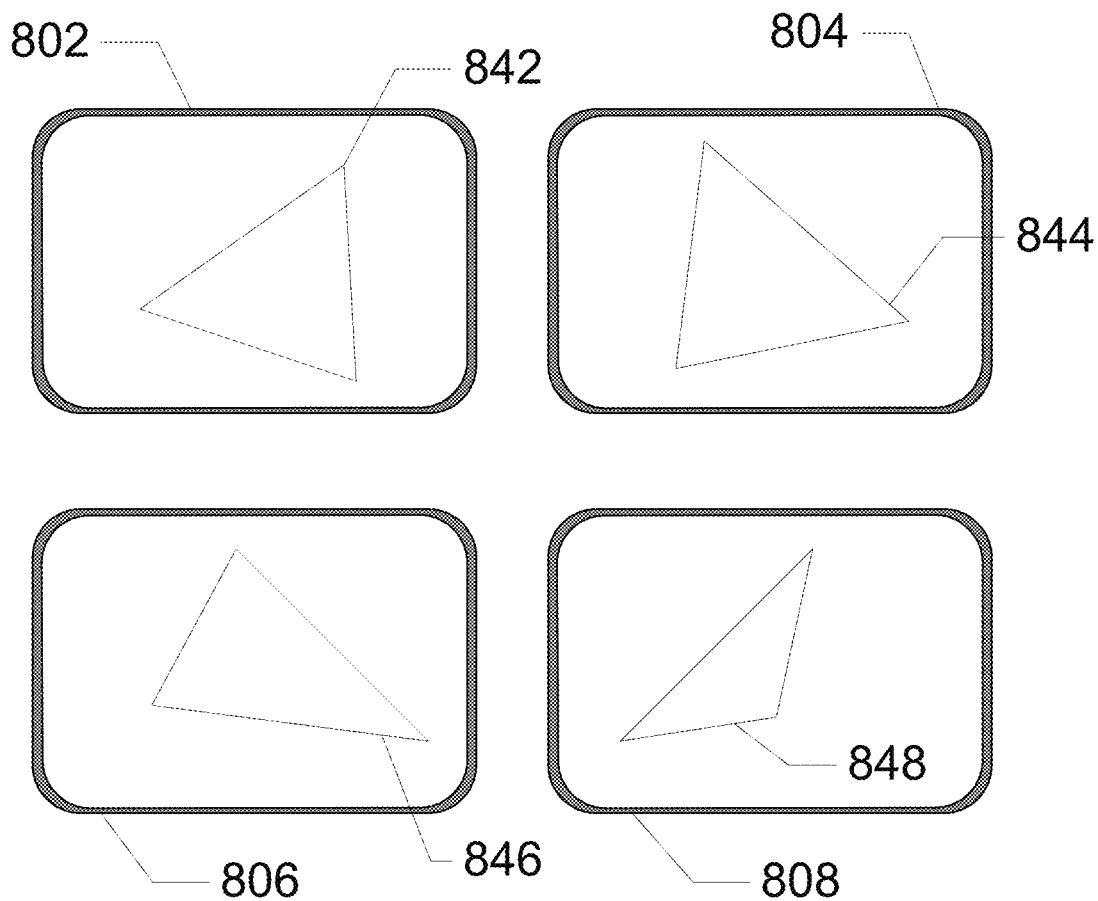

FIGS. 8A-C show a screen for depicting a 3-dimensional content, according to an example embodiment of the subject disclosure. FIG. 8A shows a master display 802 having a 3-dimensional content 810 to share with other slave displays that may be detected in the vicinity of master display 802. 3-dimensional content 810 may have several content segments corresponding to different surfaces of content 810. For example, content 810 may have four surfaces 842, 844, 846, and 848. Viewing a 3-dimensional content 810, when displayed on a single display such as display 802, may be limited in a sense that the viewer may be forced to rotate the content 810 in order to get a better view of different surfaces 842, 844, 846, 848 of a particular 3-dimensional content 810 being depicted or to able to better examine such content 810. For example, in FIG. 8A, if a viewer wants to obtain a better view of the surface 846, the viewer may be forced to rotate the content 810 on display 802, in order to bring surface 846 to the forefront. This limitation may be solved by putting together a plurality of displays in a 3-dimensional configuration forming a 3-dimensional screen with each display 802 depicting an individual surface 842, 844, 846, 848 of a particular 3-dimensional content 810 such that a viewer may simply be able to walk around the 3-dimensional screen and obtain a clear view of different surfaces 842, 844, 846, 848 of a 3-dimensional content 810.

In order to illustrate how a plurality of displays may be put together in a 3-dimensional configuration, we use a 3-dimensional cube to represent a structure in which the displays may be put together to form a screen. FIG. 8B shows how four displays 802, 804, 806, and 808 may be put together in a cubic formation to create a 3-dimensional screen 816 as represented by structure 800. Structure 800 may have four sides with an open top and bottom. The front side 801 may represent the side corresponding to display 802. The right side 803 may represent the side corresponding to display 804. The rear side 805 may represent the side corresponding to display 806. Finally, the left side 807, may represent the side corresponding to display 808. Detection of a 3-dimensional configuration of displays 802, 804, 806, and 808 may be achieved by any combination of hardware, software, logic, transceivers, etc. that may be embedded within each display 802, 804, 806, 808. Once displays 802, 804, 806, and 808 are put together in such a cubic formation, sensors 112, as discussed in relation to FIG. 1A, may be utilized to detect a 3-dimensional configuration of the displays 802, 804, 806, 808. The location and proximity sensors 112 embedded in every display 802, 804, 806, 808, may detect such a configuration. Through algorithms present on software that may be included in the logic located on the memory of any one of the displays 802, 804, 806, 808 forming the screen 816, each surface 842, 844, 846, 848 on content 810 may be assigned to one of the displays 802, 804, 806, 808 forming the screen 816. Depending on the structure of a particular 3-dimensional content 810, more than one surface 842, 844, 846, 848 may be assigned to any one display 802, 804, 806, 808 or in the alternative, a surface 842, 844, 846, 848 may be depicted on more than one display 802, 804, 806, 808. The assignment however may be such that the created 3-dimensional surface 842, 844, 846, 848 may accurately depict the intended 3-dimensional content 810.

FIG. 8C shows how each surface 842, 844, 846, 848 of content 810 may be assigned to different displays 802, 804, 806, 808 forming the screen 816 thus enabling a 3-dimensional depiction of content 810. As shown in FIG. 8C, content segments 842, 844, 846, and 848 of content 810, may be assigned to displays 802, 804, 806, and 808 respectively, which together may form the 3-dimensional screen 816. The example embodiment of the subject disclosure provided in FIG. 8C may enable a viewer to have a 360 degrees view of a 3-dimensional object. By moving around the cubic screen 816, a viewer may be able to examine a 3-dimensional content 810 from a variety of perspectives providing the viewer with a real-life experience of examining and viewing a 3-dimensional object.

Figure 9A:
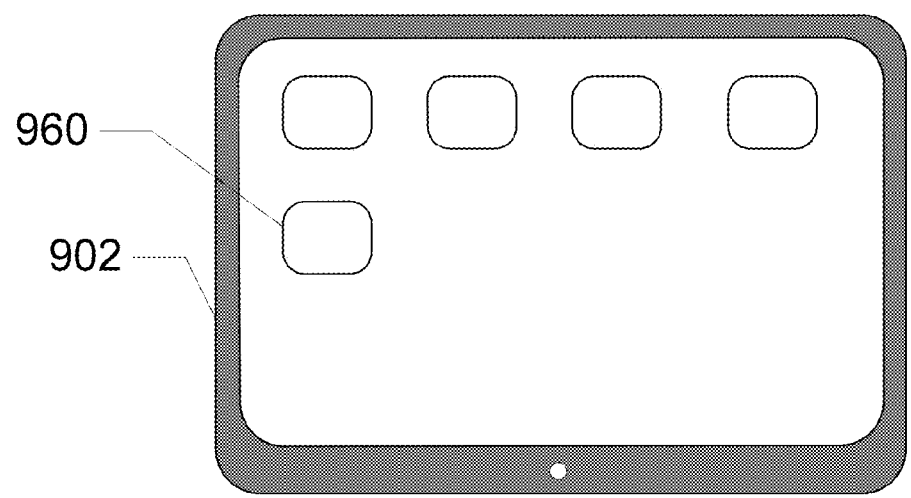
FIGS. 9A-B show a user interface for managing a plurality of displays, according to an example embodiment of the subject disclosure.
Figure 9B:
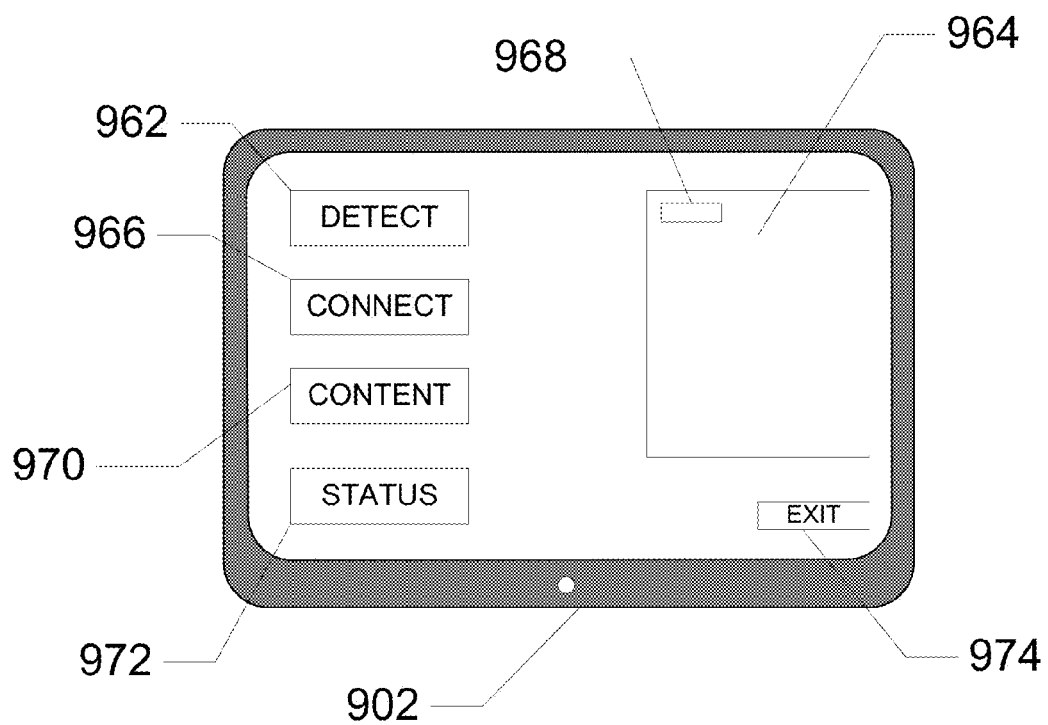

FIGS. 9A-B show a user interface for managing a plurality of displays, according to an example embodiment of the subject disclosure. The user interface may correspond to a computer application that may be installed on a display, allowing implementation of the subject disclosure. The application and the user interface may be created using any computer software programming languages that may be operable on a display's operating system. The software programming languages that may be used to create the user interface may include C-programming language, C++ programming language, C-Objective programming language, Visual Basic language, any windows based programming language, as well as any Unix-based programming language. Regardless of a language used in creating such a user interface, the user interface may include a compatibility feature, thus allowing the software to be installable on different types of displays, which in turn may enable connecting different types of displays to form the screen. For example, through such an interoperability feature, a Samsung Galaxy Tab® may be connected to an Apple's iPad® in order to form a screen and thus share contents.

FIG. 9A shows an example embodiment, in which a home screen of a display 902 is shown including an application icon corresponding to the software application 960. Application 960 may be downloaded by a user of display 902 for example, through accessing an application store or downloading the application via a website. FIG. 9B shows a screenshot of the user interface of application 960 that may appear once the software application has been activated by a user. As shown, software application 960 may include a detect button 962, which when selected may initiate a search for other displays in the vicinity of display 902. A window 964 that may be embedded within the application 960, lists any other displays that may have been detected. The user of display 902 may select any of the detected displays shown on window 964 and thereafter initiate a request for connecting to the selected displays using button 966. Once authorized and connected, an indicator 968 may appear on window 964 indicating whether the display on which the application 960 is running is designated as a master display or slave display. Thereafter, selecting button 970 would allow a user to select any content that he or she may want to share with other detected slave displays. While application 960 is running on any display, selecting button 972 may allow display 902 to switch roles from being a master display to a slave display or vice versa. Switching roles may result in indicator 968 to change accordingly. Finally selecting button 974 allows a user to exit the screen or terminate any ongoing collaboration.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A method comprising:
   detecting, by a first display comprising a processor and a sensor, a second display within a first distance of the first display and further detecting a third display within a second distance of the first display, the first distance being shorter than the second distance;
   connecting, by the processor of the first display based on detecting the second display being within the first distance of the first display and the third display being within the second distance of the first display, the first display with the second display to form a screen for depicting a content, the screen comprising only the first display and the second display;
   in response to connecting with the second display to form the screen, assigning, by the processor of the first display, a first segment of the content to the first display and a second segment of the content to the second display;
   transmitting, by the processor of the first display to the second display, the second segment of the content for display by the second display;
   causing, by the processor of the first display, the first segment of the content to be displayed on the first display;
   after the content is displayed on the screen formed by the first display and the second display, further transmitting, by the processor of the first display, a copy of the content to the second display;
   receiving, by the processor of the first display from the second display, a warning that the second display has utilized a feature to terminate a connection with the first display; and
   after receiving the warning from the second display, receiving, by the processor of the first display from the second display, a confirmation message indicating a removal of the second display from the screen.

2. The method of claim 1, further comprising:
   requesting, from the second display, an authorization to form the screen, wherein requesting the authorization to form the screen comprises transmitting a message to the second display, the message requesting a password for an approval to form the screen;
   receiving, from the second display, a notification of the approval to form the screen; and
   forming the screen in response to receiving the notification of the approval from the second display.

3. The method of claim 1, wherein the second display and the third display are detected by the sensor associated with the first display and wherein the sensor is located on an edge of the first display.

4. The method of claim 1, wherein the sensor is at least one of an accelerometer, a proximity sensor, a location sensor, an electronic compass, a near-field communication device, or a viewer sensor.

5. The method of claim 1, wherein the first display is designated as a master display, the master display hosting the content depicted on the screen and being capable of terminating the screen.

6. The method of claim 1, further comprising periodically saving, by the processor of the first display, the first segment of the content and the second segment of the content.

7. The method of claim 1, further comprising:
   determining a change in a position of the second display relative to the first display, the change in the position comprising the second display being moved a distance from the first display greater than the first distance; and in response to determining the change in the position of the second display, terminating the screen, wherein terminating the screen causes the second display to display the content.

8. A first display comprising:
a processor;
a sensor; and
a memory storing instructions that, when executed by the processor, cause the processor to perform operations comprising:
   detecting a second display within a first distance of the first display and further detecting a third display within a second distance of the first display, the first distance being shorter than the second distance,
   connecting, based on detecting the second display being within the first distance of the first display and the second display being within the second distance of the first display, with the second display to form a screen for depicting a content, the screen comprising only the first display and the second display,
   in response to connecting with the second display to form the screen, assigning a first segment of the content to the first display and a second segment of the content to the second display,
   transmitting the second segment of the content to the second display for display by the second display,
   causing the first segment of the content to be displayed on the first display,
   after the content is displayed on the screen formed by the first display and the second display, further transmitting a copy of the content to the second display,
   receiving, from the second display, a warning that the second display has utilized a feature to terminate a connection with the first display, and
   after receiving the warning from the second display, receiving, from the second display, a confirmation message indicating a removal of the second display from the screen.

9. The first display of claim 8, wherein the sensor is proximate an edge of the first display.

10. The first display of claim 8, wherein the first display is designated as a master display, the master display hosting the content depicted on the screen and being capable of terminating the screen.

11. The first display of claim 8, wherein the first display or the second display comprises a cellular device comprising a liquid crystal display, a laptop computer, or a tablet computer.

12. The first display of claim 8, wherein the operations further comprise:
   determining a change in a position of the second display relative to the first display, the change in the position comprising the second display being moved a distance from the first display greater than the first distance; and
   in response to determining the change in the position of the second display, terminating the screen, wherein terminating the screen causes the second display to display the content.

13. The first display of claim 8, wherein the sensor comprises one of a motion sensor, an accelerometer, a proximity sensor, a near-field communication device, an electronic compass, or a viewer sensor.

14. A non-transitory computer-readable medium storing instructions that, when executed by a processor of a first display, cause the processor to perform operations comprising:
   detecting a second display within a first distance of the first display and further detecting a third display within a second distance of the first display, the first distance being shorter than the second distance;
   connecting, based on detecting the second display being within the first distance of the first display and the third display being within the second distance of the first display, with the second display to form a screen for depicting a content, the screen comprising only the first display and the second display;
   in response to connecting with the second display to form the screen, assigning a first segment of the content to the first display and a second segment of the content to the second display;
   transmitting the second segment of the content to the second display for display by the second display;
   causing the first segment of the content to be displayed on the first display;
   after the content is displayed on the screen formed by the first display and the second display, further transmitting a copy of the content to the second display;
   receiving, from the second display, a warning that the second display has utilized a feature to terminate a connection with the first display; and
   after receiving the warning from the second display, receiving, from the second display, a confirmation message indicating a removal of the second display from the screen.

15. The non-transitory computer-readable medium of claim 14, wherein the operations further comprise:
   requesting, from the second display, an authorization to form the screen, wherein requesting the authorization to form the screen comprises transmitting a message to the second display, the message requesting a password for an approval to form the screen;
   receiving, from the second display, a notification of the approval to form the screen; and
   forming the screen in response to receiving the notification of the approval from the second display.

* * * * *